United States Patent [19]
Kemeny

[11] Patent Number: 5,708,759
[45] Date of Patent: Jan. 13, 1998

[54] SPEECH RECOGNITION USING PHONEME WAVEFORM PARAMETERS

[76] Inventor: Emanuel S. Kemeny, 1400 S. Joyce St., Arlington, Va. 22202

[21] Appl. No.: 746,999

[22] Filed: Nov. 19, 1996

[51] Int. Cl.[6] .................. G10L 5/00; G10L 5/06; G10L 9/12
[52] U.S. Cl. .......... 395/2.63; 395/2.44; 395/2.2; 395/2.22; 395/2.54; 395/2.53; 395/2.61
[58] Field of Search .................. 395/2.12–2.14, 395/2.44–2.45, 2.52–2.54, 2.2–2.22, 2.61; 364/487

[56] References Cited

U.S. PATENT DOCUMENTS

| | | | |
|---|---|---|---|
| 3,553,372 | 1/1971 | Wright et al. | 395/2.2 |
| 4,559,602 | 12/1985 | Bates, Jr. | 364/487 |
| 4,661,915 | 4/1987 | Ott | 395/2.63 |
| 4,692,941 | 9/1987 | Jacks et al. | 395/2.69 |
| 4,882,757 | 11/1989 | Fisher et al. | 395/2.62 |
| 5,359,695 | 10/1994 | Ohora et al. | 395/2.44 |
| 5,388,182 | 2/1995 | Benedetto et al. | 395/2.14 |
| 5,495,554 | 2/1996 | Edwards et al. | 395/2.14 |
| 5,528,725 | 6/1996 | Hui | 395/2.45 |

OTHER PUBLICATIONS

T.W. Parson, *Voice and Speech Processing*, McGraw–Hill Book. Co. 1986. pp. 170,171,208,209,291.

W. J. Hess IEEE Trans. on Acoustics, etc. vol. ASSP-24, No. 1, *A Pitch–Synchronous Digital Feature Extraction System for Phoneme Recognition of Speech*, Feb., 1976. pp. 14–25.

Peking Faculty, *Modern Chinese*, Dover Press, 1971. pp. 4,5.

Long & Datta, "Wavelet Based Feature Extraction for Phoneme Recognition", ICSLP96 Oct. 1996, pp. 1–4.

Tan, Fu & Spray, "The Use of Wavelet Transforms in Phoneme Recognition", ICSLP96, Oct. 1996, pp. 1–4.

Matthews, Bangham & Cox, "Audiovisual Speech Recognition Using Multiscale Nonlinear Image Decomposition", ICSLP '96, Oct. 1996, pp. 1–14.

Mallat & Zhong, "Wavelet Transform Maxima and Multiscale Edges", Wavelets and Their Applications, Jones & Bartlett, Boston, 1992, pp. 67–104.

*Primary Examiner*—David D. Knepper

[57] ABSTRACT

A method and apparatus for computer speech recognition based on time-domain phoneme waveform identification. In Mainwave-Ripple Model (MRM) analysis, the waveform is located in a short interval called a frame, and waveform structural features are located and measured, to form a waveform analysis array in terms of fine-structure parameters and main-structure parameters. Analysis can also derive multi-frame pattern analysis arrays. In training mode, phoneme reference arrays are formed by combining a known most-probable analysis array with its corresponding phoneme symbol. In recognition mode, unknown input signal analysis arrays are compared with prestored reference arrays, whereby a best-match recognition is made. Selectable levels of processing provide selectable speed versus accuracy, in terms of protowave, phonode, or phoneme recognition. A computer program storage device readable by a computer system for implementing the method is included.

17 Claims, 7 Drawing Sheets

| SFAA # | av | zxh | pw23 | nrr | nra | SFd pho | MFd pho |
|---|---|---|---|---|---|---|---|
| 1 | 127 | 4 | 0 | 0 | 0.0 | q | |
| 2 | 126 | 8 | 0 | 0 | 0.0 | q | |
| 3 | 126 | 8 | 0 | 0 | 0.0 | q | |
| - | | | | | | - | |
| 8 | 126 | 14 | 0 | 0 | 0.0 | q | q |
| 9 | 123 | 17 | 0 | 0 | 0.0 | z | |
| 10 | 122 | 19 | 0 | 0 | 0.0 | z | |
| 11 | 121 | 18 | 0 | 0 | 0.0 | z | |
| - | | | | | | - | |
| 17 | 116 | 16 | 0 | 0 | 0.0 | z | |
| 18 | 124 | 3 | 0 | 0 | 0.0 | q | z |
| 19 | 126 | 7 | 0 | 0 | 0.0 | q | |
| 20 | 123 | 20 | 0 | 0 | 0.0 | z | |
| 21 | 111 | 17 | 0 | 0 | 0.0 | z | |
| 22 | 94 | 6 | 19 | 5 | 0.3 | e | k |
| 23 | 79 | 6 | 18 | 4 | 0.2 | e | |
| 24 | 80 | 6 | 17 | 4 | 0.5 | u | |
| 25 | 87 | 7 | 13 | 2 | 0.7 | r | |
| 26 | 87 | 8 | 12 | 3 | 0.7 | a | |
| 25 | 87 | 7 | 13 | 2 | 0.7 | r | |
| - | | | | | | - | |
| 33 | 95 | 8 | 13 | 3 | 0.8 | i | |
| 34 | 97 | 8 | 13 | 3 | 1.1 | i | |
| 35 | 98 | 8 | 13 | 3 | 0.9 | i | |
| 36 | 98 | 7 | 13 | 3 | 0.7 | i | |
| 37 | 99 | 4 | 14 | 4 | 0.3 | i | ih |
| 38 | 98 | 5 | 20 | 4 | 0.2 | e | |
| 39 | 98 | 4 | 20 | 3 | 0.3 | e | |
| 40 | 101 | 4 | 20 | 4 | 0.2 | e | |
| 41 | 101 | 4 | 20 | 3 | 0.1 | e | |
| 42 | 102 | 4 | 22 | 3 | 0.3 | m | ee |
| 43 | 103 | 3 | 20 | 3 | 0.2 | e | |
| 44 | 101 | 4 | 21 | 3 | 0.2 | e | |
| 45 | 100 | 4 | 23 | 4 | 0.2 | m | |
| 46 | 101 | 4 | 21 | 3 | 0.2 | e | |
| - | | | | | | - | |
| 51 | 100 | 15 | 18 | 2 | 0.2 | r | |
| 52 | 107 | 20 | 0 | 0 | 0.0 | z | |
| 53 | 117 | 18 | 0 | 0 | 0.0 | z | |
| 54 | 120 | 21 | 0 | 0 | 0.0 | z | |
| - | | | | | | - | |
| 60 | 125 | 16 | 0 | 0 | 0.0 | z | |
| 61 | 126 | 12 | 0 | 0 | 0.0 | q | z |
| 62 | 126 | 7 | 0 | 0 | 0.0 | q | |
| 63 | 127 | 5 | 0 | 0 | 0.0 | q | |

FIG. 6

TABLE OF PHONEME/PHONODES

| PHONEMES | PHONODE |
|---|---|
| AH, AW | AH |
| AA, EH, OH | EH |
| IH, OO, UH | IH |
| EE | EE |
| P, T, K | K |
| B, D, G | D |
| M, N, L, R, W | W |
| S, F, CH, Z, V, TH | Z |

FIG. 7

700 'Listing of Processing Procedures

710 'Initialization
    Set constants and variables

720 'Prompt/Status
    Test status and determine prompt
    Display prompt and status
    Open files: input and output: Names?
    Select TR mode: training or recognition?
    Select recog mode: phoneme or phonode?
    Prompt speech? EOF? Close? Abort?

730 'Input Processing
    access input and output files
    fetch a long segment of speech signal
    process for VOX, AGC, ADC, and AN
    buffer the processed signal data 740 'Frame Analysis
    fetch a short interval (frame) of buffer data
    analyze for fine-structure parameters
    identify protowave group
    analyze for main-structure parameters
    form waveform parameter array (SFAA)
    if T/R mode = training then goto 750
    if T/R mode = recognition then goto 760

750 'Training Mode
    Reference array generation:
    -Singular (SRA)
    -Universal (URA)
    -Personal (PRA)
    -Phonode (PdRA)
    return to prompt/status 720

760 'Recognition Mode
    single-frame recognition (SFR)
    multi-frame recognition (MFR)
    word recognition (WR)
    function recognition (FR)
    recognition output:Word/Function (Wd/Fd)
    return to prompt/status 720

770 'Print and Return
    Print or skip print
    return to prompt/status 720

780 'CLOSE and END
    Close files
    return to prompt/status 720
    END

SPEECH RECOGNITION USING PHONEME WAVEFORM PARAMETERS

1.0 BACKGROUND OF THE INVENTION

1.1 Field of the Invention

The invention is in the field of computer speech recognition, and more particularly, phoneme waveform identification, with application to systems including speech-to-text, speech signal data reduction, and voice command and control.

1.2 Prior Art and the Invention

The prior art in speech recognition is well aware that, for example, spoken English uses 47 elemental sounds, called phonemes, and that these phonemes can be seen as 47 distinctive phoneme waveforms on microphone-oscilloscope equipment.

The present invention efficiently and uniquely recognizes each phoneme by direct measurement of structural features of the phoneme waveform itself, in terms of mainwave and ripplewave components.

The prior art, however, has found waveform identification difficult, and has relied on transformation of the time-waveform into a frequency-spectrum, whose frequency peaks, called formants, identify the phoneme. The transformation is typically done by band-pass filters, or by mathematical algorithms such as Fast Fourier Transform (FFT) or Linear Prediction Coding (LPC), which are rigorous, but costly in terms of lengthy computations and smooth-out of fast-transition signal data.

It is important to note that prior art may be pertinent if it includes analysis of the waveform itself for certain features, such as prominent pulses and zero crossings, which provide easily-accessible initial information, such as pitch period, voiced-unvoiced parameters, and limited-vocabulary word-recognition.

But ultimately, for phoneme recognition, the prior art relies on the frequency-transform and its formant pattern, as seen in the following references.

The following references are cited as pertinent prior art, with comments to clarify their relevance to and divergence from critical features of this invention.

[1] Parsons, T. W., "Voice and Speech Processing", McGraw-Hill Book Co., 1986. This textbook discusses the great variety in prior art involving time-domain and frequency-domain techniques for speech signal analysis, recognition, and printout.

[2] U.S. Pat. No. 3,553,372, Wright et al, issued Jan. 5, 1971, This patent shows pertinent prior art because it includes various time-domain techniques for zero-crossing and prominent-peak detection, thereby deriving initial parameters related to pitch-period and first-formant frequency (F1), these used in limited-vocabulary word-recognition. However, for phoneme identification, the patent relies on frequency-spectrum (Fourier) transform techniques.

[3] Hess, W. J., "A Pitch-Synchronous Digital Feature Extraction System for Phoneme Recognition of Speech", IEEE Trans. on Acoustics, etc., VOL. ASSP-24, No.1, February analysis for prominent pulse and zero-crossover parameters, but relies on frequency-domain analysis to identify phonemes.

[4] U.S. Pat. No. 4,882,757, Fisher et al, issued Nov. 21, 1989, teaches context-correction for speech recognition.

[5] U.S. Pat. No. 4,692,941 Jacks et al, issued Sep. 8, 1987, teaches text-to-speech conversion using waveform sequencing of phonemes and transitions.

[6] U.S. Pat. No. 4,661,915, Ott, issued Apr. 28, 1987, teaches an allophone vocoder, in which a speech signal is first analyzed for phonemes which in turn are used to generate an allophone sequence to better approximate the original speech signal in a synthesizer at a local or remote station, where a printer and a speech synthesizer output the data.

[7] Peking Faculty, "Modern Chinese", Dover Press, 1971, teaches phonetic spelling of Chinese words, plus four pitch-contours for vowels to affect meaning.

2.0 SUMMARY OF THE INVENTION

2.1 The Basic Invention

The present invention provides efficient and unique speech recognition by using three major processing procedures:

(1) Analysis: fetching a frame (20 millisecond segment) of signal, then in the frame locating and measuring structural features of any waveform present in terms of a mainwave-ripple model, thereby deriving a set of measurement numbers (a waveform parameter array) called a single-frame analysis array, which uniquely defines the waveform;

(2) Training: generating known-phoneme reference arrays by combining the analysis array of a known input spoken phoneme with its corresponding typed-in phoneme symbol, and repeating this procedure for different input phonemes to derive a set of known-phoneme reference arrays;

(3) Recognition: recognizing unknown input speech by sequentially locating and measuring each frame waveform, and comparing its analysis array with the pre-stored set of known-phoneme reference arrays, whereby the best match yields a phoneme decision output.

2.2 Discoveries and Innovations

Original research by the inventor has yielded a number of discoveries and innovations which are advantageously included in the invention, and fully described in the detailed description.

Some of these are here briefly noted:

(1) Fine-structure measurements, in terms of mainwave amplitude and zero-crossings, identify the waveform as one of four basic phoneme waveforms (bpw's), called protowaves: voiced, fricative, stop, and mixed, which are representative of the 47 English phoneme waveforms;

(2) Main-structure measurements, in terms of a mainwave-ripple model which includes flyback-pulse parameters;

(3) Phonodes (nodal phonemes): eight phonemes of the 47 may be selected as phonodes, to represent groups of phonemes having similar sounds and similar waveforms, whereby coarse recognition and speak-back may be achieved;

(4) Universal reference arrays (URA's), which are automatically generated by interpolation to create a plurality of sets of phoneme reference arrays covering the male-female vocal frequency range.

4.0 DETAILED DESCRIPTION

The present invention provides speech recognition using three major operations: analysis, training and recognition. In particular, the analysis involves direct measurements of the phoneme waveform itself, to derive a set of waveform parameters called an analysis array which uniquely defines the waveform structure.

To best understand the invention, a brief description of speech sounds is now presented.

Speech sounds are generated in the vocal tract. Air from the lungs is forced to flow through the glottis (the opening between the vocal cords in the throat), branches through the mouth and nasal cavities, and emitted through lips and nose.

As a result, two kinds of speech sounds are possible: voiced (using the vocal cords, which vibrate at pitch frequency to cause pitch pulses of air), and unvoiced (using only the air flow, which is a hissed sound). Phonemes (voiced or unvoiced) are formed by the tongue position, which determines the size and effect of mouth and nasal cavities as resonant chambers, and thereby determines the waveshape (and frequency spectrum) of the emitted sound.

4.1 The Invention As a System

Figure 1:
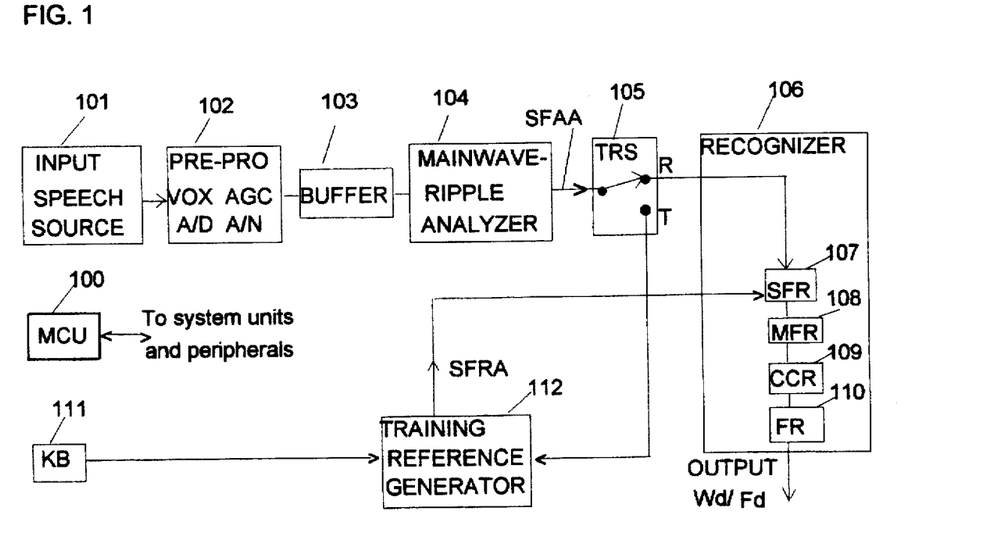
FIG. 1 is a block diagram showing major components of the invention as a system.

The invention as a system is illustrated in the block diagram of FIG. 1.

Referring to FIG. 1, master control unit (MCU) 100 is the central controller, which includes a monitor display, and connections to all system units and peripheral units (not drawn).

Speech input source 101 provides an input speech signal which may be known or unknown.

Pre-processor 102 provides the well-known functions: VOX (voice-operated control); ADC (analog to digital converter); AGC (automatic gain control); and AN (amplitude normalization). AN in this invention fixes the peak amplitude of a loud vowel (such as AH), at say 100 on a scale of zero +/−127, whereby other phoneme amplitudes are normalized thereto. Also, ADC is set to sample at 10K samples per second (sps), to ensure resolution of phoneme signals containing frequencies to 4000 Hz.

Buffer 103 stores the output of pre-processor 102.

Mainwave-Ripple Analyzer 104 performs a number of functions, including: fetching a short interval of signal, called a frame (20 to 30 milliseconds) from buffer 103; examining the frame to locate and measure any waveform present in terms of fine-structure and main-structure, thereby outputting a set of measurement numbers (waveform parameters), called a single-frame analysis array (SFAA).

Training/Recognition Switch (TRS) 105 is set to training mode T for training mode, which couples analyzer 104 to training reference generator 112.

In training mode, the operator is prompted on screen to speak a single known-phoneme input signal, with the corresponding known-phoneme symbol typed-in on keyboard (KB) 111.

Training reference generator (TRG) 112 thus receives two inputs: the phoneme analysis arrays for the one spoken phoneme, and the one keyboard phoneme symbol. Then the most-probable analysis array is selected by its significant parameter pattern in the multi-frame sequence, and combined with its corresponding typed symbol, to form a known-phoneme single-frame reference array (SFRA).

This process is repeated for other spoken input phonemes, until a full set of phoneme reference arrays (SFRA's) is generated, and stored both in TRG 112, and in single-frame recognizer (SFR) 107.

Training/Recognition switch (TRS) 105 is then set to recognition mode R, which couples the analyzer to single-frame recognizer (SFR) 107.

Now, in recognition mode, unknown input speech to the analyzer is output as a corresponding sequence of unknown single-frame analysis arrays (SFAA'S) to SFR 107.

Single-frame recognizer (SFR) 107 receives and compares each unknown analysis array with each of the previously-stored known reference arrays (SFRA'S), whereby the best match yields an output single-frame decision (SFd) phoneme. This process is repeated to yield an output sequence of single-frame decision (SFd) phonemes.

Multi-frame recognizer (MFR) 108 receives the sequence of analysis arrays and SFd phonemes, and examines the sequence for a significant multi-frame pattern, including a repeat pattern or a peculiar pattern, whereby a most-probable phoneme is output as a multi-frame decision (MFd) phoneme. The process repeats to output a sequence of MFd phonemes.

Context Correction Recognizer (CCR) 109 receives and examines the sequence of MFd phonemes, using context-correction rules such as adjacent-phoneme and word-spelling, whereby a word decision (Wd) is output.

Function Recognizer (Fd) 110 examines the word decision using a table of functional words, whereby a final recognition, consisting of a joint word/function decision (Wd/Fd), is output for appropriate action.

4.2 Analysis: Fine-structure Measures

According to the invention, analysis of the waveform involves two steps: fine-structure, and main-structure measurements.

Fine-structure in a waveform is defined as structure within a very short time interval (i=1 ms), and includes parameters, called local values, of amplitude valley (avi), and zero-crossing counts (zxi). Thus, over a frame, frame distribution arrays of local values are formed (avia and zxia), as well as frame lows (avL, zxL), and frame highs (avH,zxH), all local and frame values also coded with their frame location (np).

Figure 2:
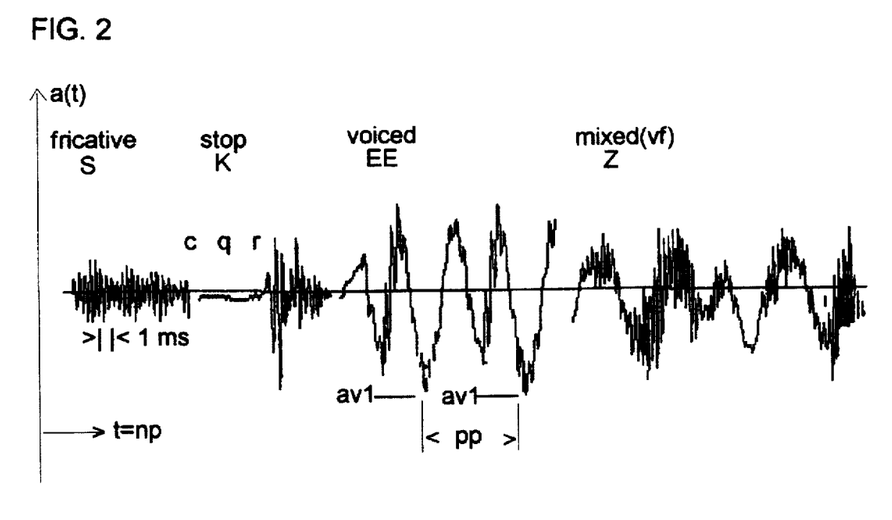
FIG. 2 illustrates four basic phoneme waveforms.

According to the invention, the fine-structure values provide an identification of the waveform as one of four basic phoneme waveforms (bpw's) illustrated in FIG. 2.

Referring to FIG. 2, each basic phoneme waveform (bpw), also called a prototype wave, or protowave, is labelled: voiced, fricative, stop, and mixed. The protowaves may thus be coded as bpw=vw, fw, sw, or mw.

Each of the protowaves is shown as a short segment of normal speech, the length depending on speech speed, and each seen to have its own structurally-distinct features in terms of size and shape of cyclic vibrations, and number of cycles per unit time.

As an example, FIG. 2 shows the 4 protowaves exemplary in the word SKIS (literal spelling), and pronounced S-K-EE-Z (phonemic spelling), noting that:

(1) the phoneme S is a fricative, or hissed sound, and is seen to be a cyclic waveform of rapid and random changes in amplitude and zero-crossover intervals;

(2) the phoneme K is a stop, or momentary quiet, consisting of: closure (c), quiet (q), and burst release (r) of air;

(3) the phoneme EE is a voiced wave consisting of: large-amplitude periodic components, labelled amplitude peak (ap), amplitude valley (av), and pitch period (pp); and smaller-amplitude components seen as ripple perturbations on the larger wave; and (4) the phoneme Z is a mixed (voiced-fricative) wave, with periodic pitch-period (pp) and random rapid ripple wave in clear view.

4.3 Analysis: Main-structure Measures

Figure 3:
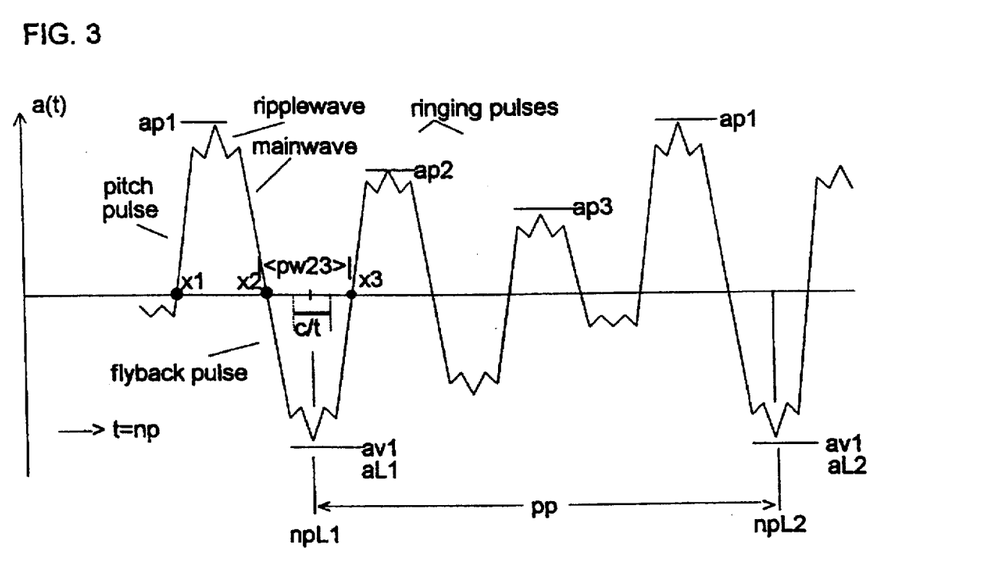
FIG. 3 illustrates the mainwave-ripple model.

According to the invention, the second step of analysis examines the main-structure of the waveform in terms of a mainwave-ripple model (MRM), as illustrated in FIG. 3.

Referring to FIG. 3, the mainwave-ripple model is seen as a complex waveform, with major components labelled: mainwave, ripplewave, and time-axis normalized position (np). The mainwave is identified as the larger wave with zero-crossings, while the ripplewave is the perturbations riding on the mainwave.

Again referring to FIG. 3, the mainwave-ripple model is further labelled for key structural elements:

(1) pitch pulse, labelled amplitude peak #1 (ap1), representing the large-amplitude stimulus-pulse of air caused by the vocal cords;

(2) flyback pulse, labelled amplitude valley #1 (av1), which is the first pulse of the ringing cycles due to the pitch-pulse stimulus, and due to resonant cavities in the mouth and nose;

(3) damped ringing pulses following the flyback pulse, until the next large pitch-pulse stimulus;

(4) ripple waves, of smaller amplitude, and riding on the large mainwave, noting that the mainwave crosses the zero-axis periodically;

(5) location of flyback-pulse av1 shown as normalized position (npv1), from which tracing starts to locate zero-crossings x2 and x3, and thereby find the flyback pulse-width (pw23);

(6) normalized ripple rate (nrr) and normalized ripple amplitude (nra), which are measured in the center-third (c/t) of the flyback pulse, using ripple wave slope analysis (s=da/dt) to find ripple rate nrr normalized to c/t, and find ripple amplitude nra normalized to valley amplitude avL;

(7) pitch-period (pp) is seen as the time-difference between the first wave's npv1 (labelled npL1), and the following wave's npv1 (labelled npL2);

(8) other features, including the highest peak in the phoneme wave, usually one of the first three peaks (ap123).

The measured waveform parameters defined above are combined to form a Single-Frame Reference Array (SFAA) which uniquely defines any phoneme waveform.

A practical example of analysis could include:
(1) sample the signal at 10K samples per second
(2) fetch a frame of 20 ms, which thus has 200 samples
(3) normalize frame-time position as np=1 to 200
(4) measure, in i=1 ms (10 samples), avi and zxi, over the frame, then avH,npvH, avL,npvL, zxH,zxL
(5) identify the basic phoneme waveform bpw
(6) locate aL1, npL1
(7) from npL1 track to find npx2 and npx3
(8) calculate pw23
(9) calculate c/t
(10) measure nrr and nra
(11) form SFAA The practical analysis example could include protowave decisions based on:
If avL>121 then bpw=qw '(127=zero offset)
If zxL>=3 then bpw=fw '(fw=fricative wave)
If zxH<=2 then bpw=vw '(vw=voiced wave)
If zxH>=3 and zxL<3 then bpw=mw '(mixed wave).

4.4 Training: Most-probable Analysis Array

Figure 4:
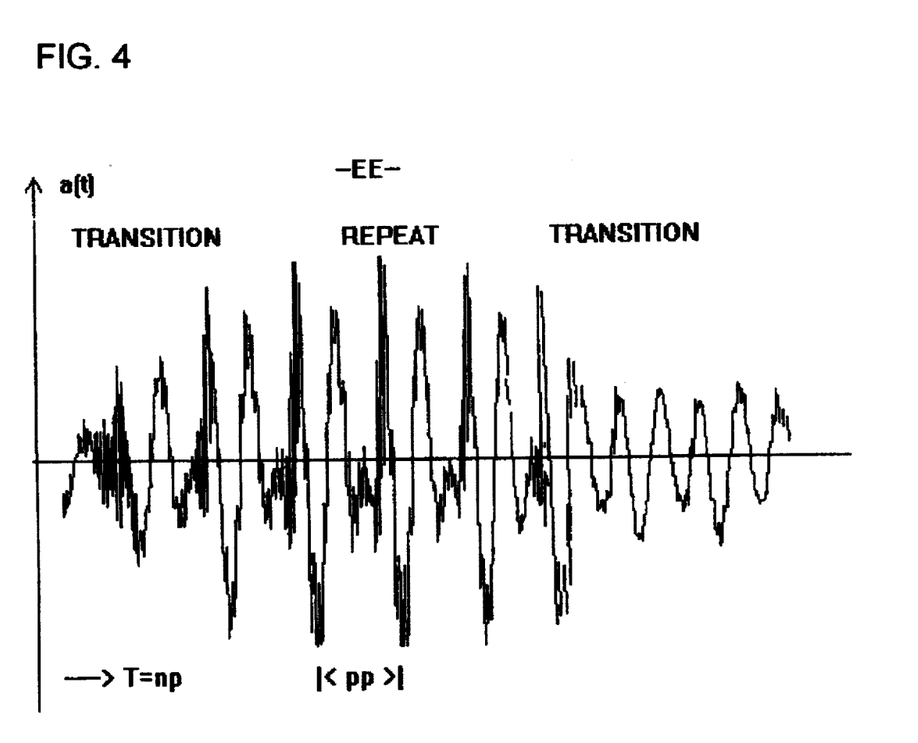
FIG. 4 illustrates a wave sequence in a single phoneme sound.

As illustrated in FIG. 4, a single phoneme sound, for example EE, may be spoken clearly, but the sound seen as a waveform is not a sequence of identical waves. Transition waves are at beginning and end, and in the center repeat waves which are thereby deemed most-probable.

As a result, analysis of the wave sequence will yield a corresponding sequence of transition and repeated analysis arrays, the repeated arrays deemed the most probable.

In training mode, the training reference generator finds the most-probable analysis array, and combines it with its corresponding phoneme symbol to form a phoneme single-frame reference analysis array (SFRA).

Again referring to FIG. 4, the transition waves are seen to change in shape and amplitude, corresponding to tongue transitions between phonemes. As a result, as each wave is analyzed to form its analysis array, the corresponding sequence of analysis arrays will show a significant transition pattern, useful in multi-frame phoneme recognition.

4.5 Recognition: Exemplary Multi-Frame Data

Figure 5:
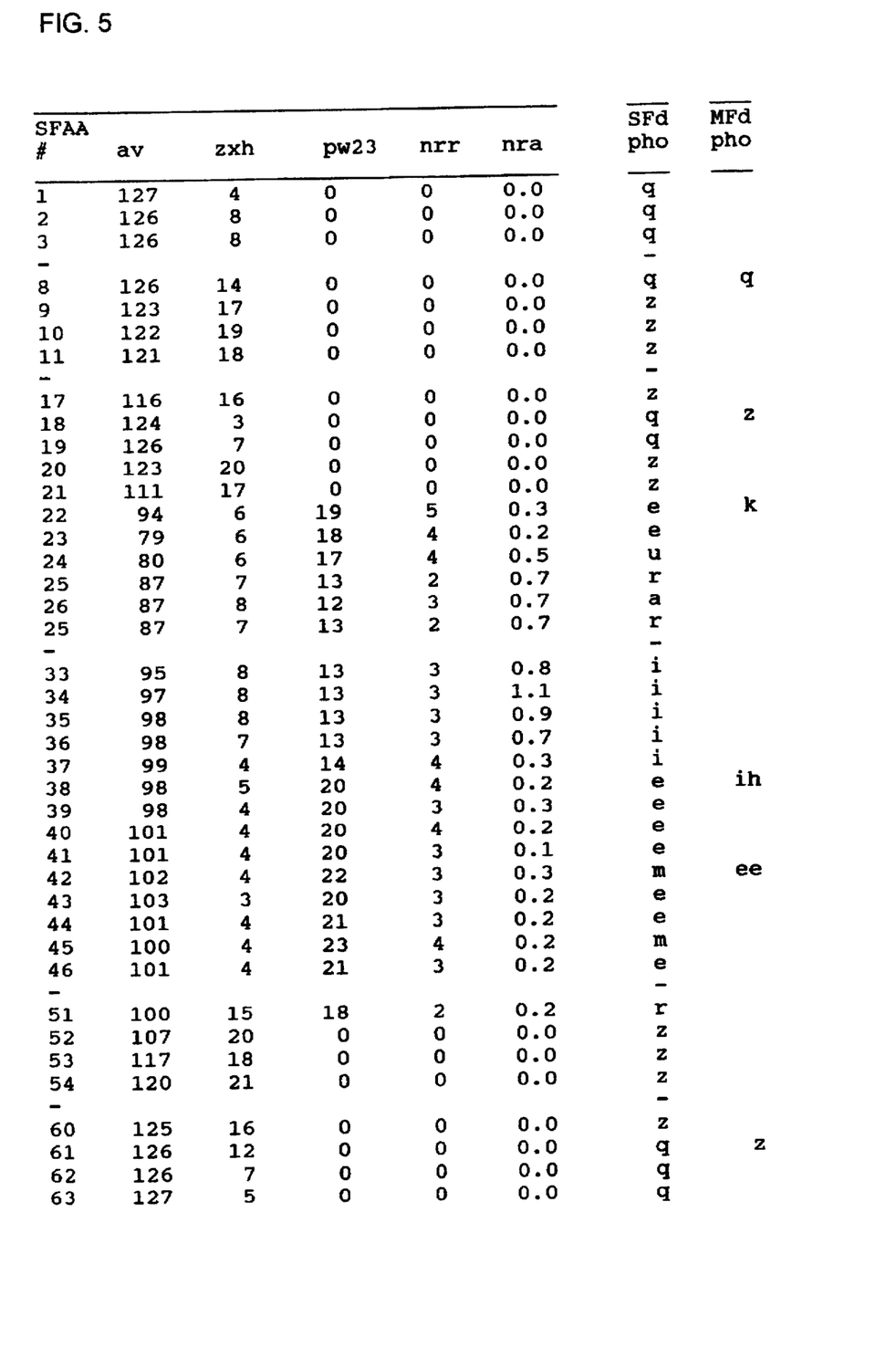
FIG. 5 is a printout of multi-frame data exemplary for the word SKIS.

FIG. 5 is a printout of exemplary multi-frame data in recognition mode, after training by a male speaker. The data is for the spoken word SKIS (phonemically spelled S-K-EE-Z).

Referring to FIG. 5, and scanning downward on the left, each line on the left is seen to be a single-frame analysis array (SFAA), and on the right the corresponding single frame decision (SFd) phoneme, and multi-frame decision (MFd) phoneme.

Certain details of FIG. 5 will now be pointed out to further illustrate the carrying out of the invention in terms of multi-frame pattern analysis:

(1) The spoken input word was SKIS (S-K-EE-Z), but scanning down the SFd phoneme column we see many different phonemes (errata due to transition waveform recognitions);

(2) The SFd errata is reduced using multi-frame pattern analysis, by finding repeat patterns or peculiar patterns. The improvement can be seen scanning down the MFd column, where S-K-EE-Z is now more clearly recognized as Z-K-IH-EE-Z.

Note that the MFd phoneme output is approximated by phonodes, whereby:

SFd phoneme S is repeatedly recognized as Z, and thus output as MFd phoneme Z;

Phoneme K, being a momentary plosive, is a short and peculiar pattern in the SFd column: q-q-z-z, which is ouput as MFd phoneme K; and Phonemes IH, EE and Z each show an SFd repeat pattern (count) of 4 or more, and thus output as corresponding MFd phonemes.

We conclude that recognition errata can be reduced, and recognition accuracy improved, using recognition rules for multi-frame significant pattern analysis, including parameter patterns, and phoneme patterns.

Thus, Multi-frame recognition rules can examine: amplitude-envelope patterns, zero-crossing patterns, repeat patterns and peculiar patterns, alternating vowel-consonant patterns, long-vowel drift phoneme patterns, decay patterns, and syllable patterns including consonant-vowel sequences.

Finally, sophisticated recognition rules are also useful, including context-correction recognition (CCR) using word-spelling rules.

4.6 Recognition: Phonemes and Phonodes

Although the 47 phonemes used in spoken English have distinctive waveforms, certain phonemes are related in that they have similar sounds and similar waveforms, and thereby fall into confusion groups.

Figure 6:
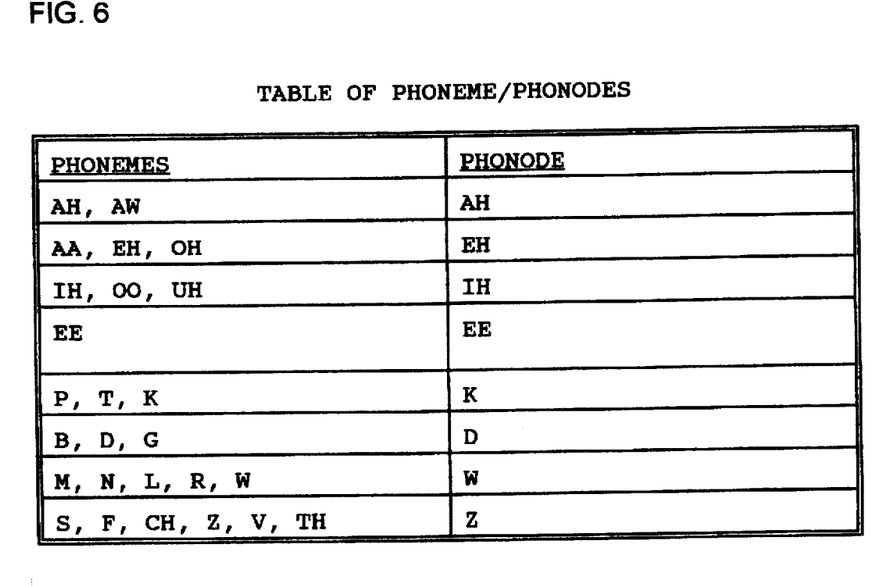
FIG. 6 is a table of phoneme/phonodes.

For coarse recognition and read-back, I select a best-representative phoneme of each confusion group, which I call a phonode, or nodal phoneme, exemplary in the table in FIG. 6, whereby 8 phonodes are used to represent 47 phonemes.

For full recognition of the 47 phonemes, multi-frame analysis of parameter patterns of each phoneme must be examined in full detail, including the patterns of fine-structure local values, whereby coarse recognition of phonodes can be resolved into full recognition of phonemes.

4.7 The Invention As a Method

Figure 7:
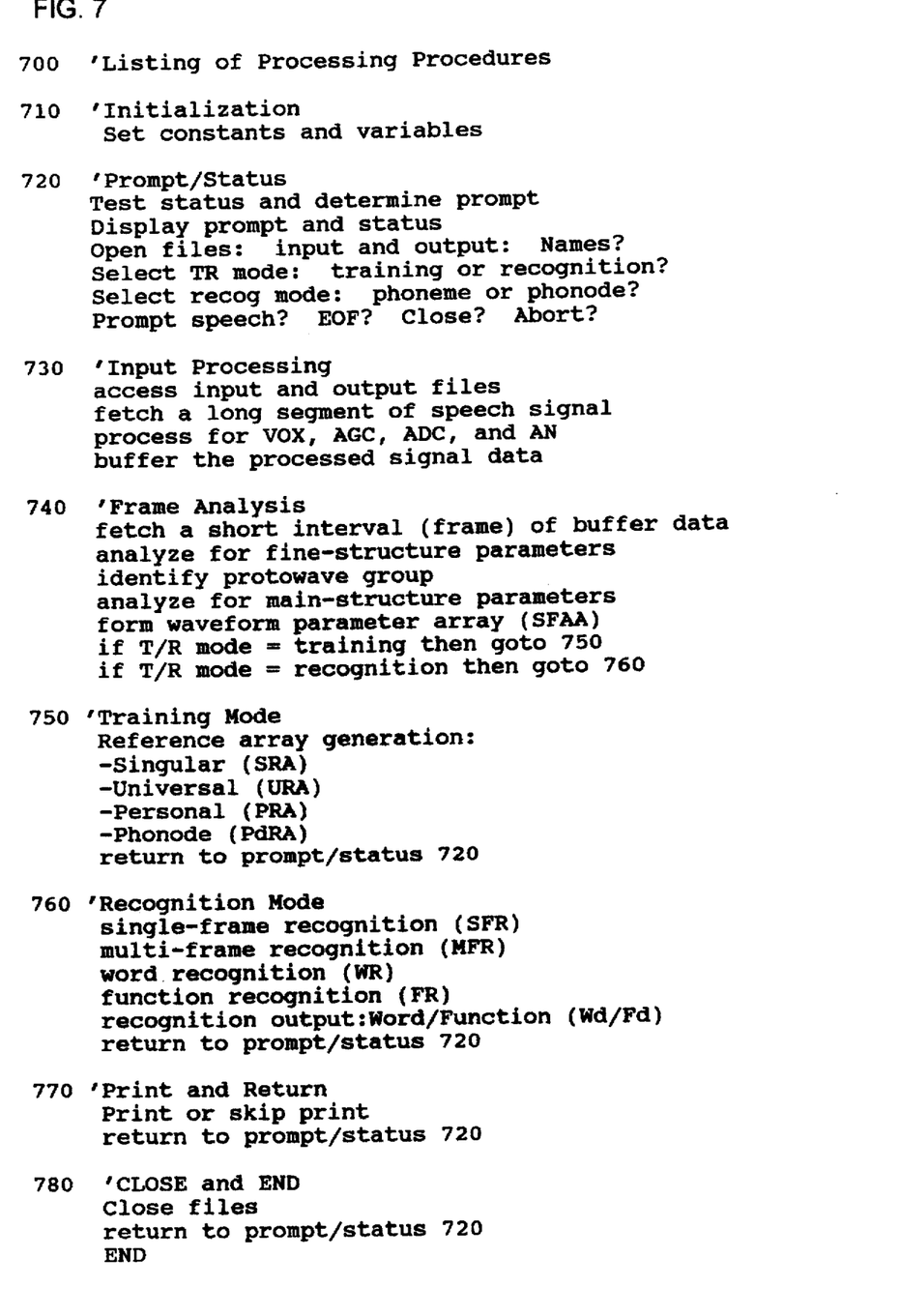
FIG. 7 is a listing of signal processing procedures which further illustrates carrying out the invention.

FIG. 7 is a listing of processing procedures which further illustrates the carrying out of the invention. The listing is in a form which is adaptable to well-known commercial programming languages including BASIC or C, available from Microsoft Corporation.

The following details refer to FIG. 7.

Initializating 710 sets constants and variables, as required by the programming language.

Prompt/Status 720 tests operation status, and thereby sets up proper conditions to prompt and respond to operator input, or respond to status direction.

Input-Processing 730 accesses input signal and provides pre-processing VOX, AGC, ADC, and AN, and buffers the pre-processed output signal.

Frame Analysis 740 fetches a frame of buffered signal and locates and measures any waveform in the frame to identify it as a protowave (bpw), then as a single-frame analysis array (SFAA), which is selectably output to Training or Recognition procedures.

Training Mode 750 includes four procedures, each generating one type of known-phoneme reference array:

(1) Singular reference arrays (SRA's);

(2) Universal reference arrays (URA's);

(3) Personal reference arrays (PRA'S).

(4) Phonode reference arrays (PdRA's)

The Singular reference arrays (SRA's) are generated by combining the most-probable array of a single spoken-phoneme input, with the corresponding typed-in phoneme symbol, thereby generating a singular reference array.

The universal reference arrays (URA's) are automatically generated by interpolating each parameter value proportionally between the analysis array of a male low-frequency voice, and the analysis array of a female high-frequency voice, thereby deriving a plurality of sets of universal reference arrays covering the male-female range. For example, the interpolation formula to find interpolation value (X) for formant frequency F2X (F2 is related to nrr), given the interpolation formant frequency F1X (F1 is related to pw23), is:

$$F2X=F2M+\{(F1X-F1M)\times((F2F-F2M)/(F1F-F1M))\}$$

where F1=1/(pw23×2), F2=nrr×6, M=Male, F=Female, and X=interpolated value.

The personal reference arrays (PRA's) of 750 are automatically generated from a calibrating command input, such as a lengthy command prompted on the screen (and which is pre-typed phonemically). For example, the prompted command spoken by the operator may be:

COMPUTER READY A E I O U which contains many key phonemes, and thus conveniently analyzed and trained automatically by multi-frame analysis as previously explained, thus creating personal reference arrays (PRA's) for the operator. This limited set of PRA's can be extended by either further prompted calibrating commands, or by extension using similar URA's.

The phonode reference arrays (PdRA's) are generated by broadening parameter value ranges to include confusion group values, whereby only phonodes are defined.

Recognition Mode 760 provides a sequence of recognition processes:

(1) Single-Frame Recognition (SFR) in which each single-frame analysis array (SFAA) is compared with a training prestored set of phoneme reference arrays, the specific set appropriately selected from the sets previously stored: SRA's, URA's, PRA's, or PdRA's, whereby the best match yields a single-frame decision (SFd) phoneme output;

(2) Multi-Frame Recognition (MFR), in which a sequence of SFd phonemes is examined for a significant pattern, including a repeat pattern or a peculiar pattern, thereby yielding a multi-frame decision (MFd) output;

(3) Context-Correction Recognition (CCR), in which context rules, including adjacent-phoneme and word-spelling rules yield a word decision (Wd) output; and (4) Functional Recognition (FR), in which the word decision is examined against a table for functional significance, including commands, thus yielding a function decision (Fd) output; and (5) outputting a joint decision Wd/Fd for response by Prompt/Status 720.

Print To File 770 prints recognized words to indications including End-of-File or Abort, to close all files and return to Prompt/Status 720, to await a new start by an operator.

4.8 Conclusions

The invention as disclosed above provides new and useful techniques for speech recognition, and lends itself to computer or microchip implementation. The explanations suggest variations by one of ordinary skill in the art, all thereby within the spirit and scope of the invention as claimed.

I claim:

1. A system for speech recognition which converts analog speech signal to corresponding phonemic text, comprising:

(a) means for pre-processing analog speech signal to output an amplitude-normalized digital signal;

(b) means for sequentially analyzing each waveform in said digital speech signal, said analyzing by Mainwave-Ripple Analysis comprising locating and measuring structural features including mainwave and ripplewave parameters, thereby outputting a corresponding sequence of phoneme waveform analysis arrays which uniquely define each phoneme waveform; and (c) means for recognizing each waveform analysis array as a phoneme, whereby said input speech signal is converted to corresponding phonemic text.

2. A system for speech recognition based on direct measurement of phoneme waveform structural features, comprising:

(a) means for providing an input analog speech signal;

(b) means for pre-processing said input analog signal to convert it to a normalized-amplitude sampled digital signal;

(c) means for buffering said pre-processed signal;

(d) means for fetching and analyzing a short interval, called a frame, of said buffered signal, said analyzing by Mainwave-Ripple Analysis comprising (d1) locating any signal waveform present in the frame, and (d2) measuring the waveform fine-structure parameters within very short time intervals, including amplitude valley and zero-crossing counts, called local values, and thereby deriving over the frame a distribution array of local values, whereby the waveform is identified as one of four or more basic phoneme waveforms, called protowaves;

(e) means for further analyzing said input waveform in the frame to measure main-structure parameters, including (e1) mainwave parameters including flyback-pulse amplitude valley and pulse width, and (e2) ripplewave parameters including normalized ripple amplitude and normalized ripple rate;

(f) means for combining said measures to form a set of waveform parameters called a single frame analysis array which uniquely defines the waveform structure;

(g) means for repeatedly fetching and analyzing frames and outputting single-frame analysis arrays per steps (d) through (f), thus outputting a multi-frame sequence of analysis arrays;

(h) mode switch means for selectively connecting the output sequence of analysis arrays to either a training reference generator or to a recognizer;

(i) training reference generator means for generating and storing known-phoneme single frame reference arrays by combining a most-probable single-frame analysis array with its corresponding typed-in phoneme symbol;

(j) single frame recognizer means for comparing an unknown single frame analysis array with a pre-stored set of known-phoneme single frame reference arrays, the best match yielding a single frame decision output phoneme;

(k) multi-frame recognition means for storing and examining the sequence of single-frame decision phoneme outputs to find a significant pattern which provides a multi-frame decision output;

(l) context-correction recognition means for examining the multi-frame decision output phoneme sequence for a word recognition;

(m) function recognition means for examining the word recognized and outputting any functional meaning; and (n) master control means for controlling and accessing all system means and providing selectable throughput with peripheral devices and human operator.

3. The speech recognition system of claim 2, wherein said throughput provided by the master control means selectably includes decisions including said protowave identification or phoneme recognition, whereby different levels of system complexity, speed and accuracy may be obtained.

4. A method of speech recognition based on direct measurement of phoneme waveform structural features, comprising the steps of:

(a) providing an input analog speech signal;

(b) pre-processing said input analog signal to convert it to a normalized-amplitude sampled digital signal;

(c) buffering said pre-processed signal;

(d) fetching and analyzing a short interval, called a frame, of said buffered signal, said analyzing by Mainwave-Ripple Analysis comprising (d1) locating any signal waveform present in the frame, and (d2) measuring the waveform fine-structure parameters within very short time intervals, including amplitude valley and zero-crossing counts, called local values, and thereby deriving over the frame a distribution array of local values, whereby the waveform is identified as one of four or more basic phoneme waveforms, called protowaves;

(e) further analyzing said waveform in the frame to measure main-structure parameters, including (e1) mainwave parameters including flyback-pulse amplitude valley and pulse width, and (e2) ripplewave parameters including normalized ripple amplitude and normalized ripple rate;

(f) combining said measures to form a set of waveform parameters called a single frame analysis array which uniquely defines the waveform structure;

(g) repeatedly fetching and analyzing frames and outputting single-frame analysis arrays per steps (d) through (f), thus outputting a multi-frame sequence of analysis arrays;

(h) mode-switch selecting the output sequence of analysis arrays to either training or recognition procedures;

(i) training the system by generating and storing (i1) singular-reference arrays which are known-phoneme single-frame reference arrays formed by combining a most-probable single-frame analysis array with its corresponding typed-in phoneme symbol, (i2) universal-reference arrays which are a plurality of sets of phoneme reference arrays formed by interpolation of parameter values between singular arrays of a basso and soprano to cover the male-female analysis array parameter range, (i3) personal-reference arrays which are generated by prompted calibrating commands, and (i4) phonode-reference arrays which are generated by broadening parameter value ranges to include confusion group values;

(j) recognizing phonemes using (j1) single-frame recognition which compares an input unknown single-frame analysis array with a pre-stored set of known-phoneme single-frame reference arrays, the best match yielding a single-frame decision output phoneme, and (j2) multi-frame recognition by storing and examining the sequence of single-frame decision phoneme outputs to find a significant pattern which provides a multi-frame decision phoneme output;

(k) context-correction recognizing by examining the multi-frame decision output phoneme sequence for a word recognition;

(l) function recognizing by examining the word recognized and outputting any functional meaning; and (m) master controlling all processing including accessing all processing procedures and providing selectable throughput with peripheral devices and human operator.

5. The speech recognition method of claim 4, wherein said master controlling provides selectable throughput which includes decisions including said protowave identification, or phonode or phoneme recognition, whereby different levels of method complexity, speed and accuracy may be obtained.

6. In a method of speech recognition, a method of waveform analysis comprising the steps of:

(a) providing an input analog speech signal;

(b) pre-processing said input analog signal to convert it to a normalized-amplitude sampled digital signal;

(c) buffering said pre-processed signal;

(d) fetching and analyzing a short interval, called a frame, of said buffered signal, said analyzing by Mainwave-Ripple Analysis comprising (d1) locating any signal waveform present in the frame, and (d2) measuring the waveform fine-structure parameters within very short time intervals, including amplitude valley and zero-crossing counts, called local values, and thereby deriving over the frame a waveform analysis array comprising a distribution of local values, including frame high and low local values, whereby the waveform is identified as one of four or more basic phoneme waveforms, called protowaves.

7. The method of claim 6, further comprising the steps of:

(e) further analyzing said waveform in the frame to measure mainwave-ripplewave parameters including (e1) mainwave parameters including flyback-pulse amplitude valley and pulse width, and (e2) ripplewave parameters including normalized ripple amplitude and normalized ripple rate, and (f) combining said measures to form a set of waveform parameters called a single frame waveform analysis array whereby the waveform structure is uniquely defined.

8. The method of claim 7, further comprising the steps of:

(g) generating and storing singular-reference arrays for a single speaker, said generating comprising the steps of:

(g1) speaking a sequence of reference sounds as prompted by computer peripherals including visual and sound to generate a corresponding sequence of single-frame analysis arrays, and (g2) using multi-frame analysis to find and combine each most-probable analysis array with its corresponding prompt phoneme symbol, thereby generating a corresponding sequence of singular-reference arrays.

9. The method of claim 8, further comprising recognition of unknown speech as spoken by said single speaker, said recognition comprising the steps of:

(h) analyzing an unknown speech input signal to derive its corresponding sequence of unknown analysis arrays;

(i) comparing each said unknown analysis array with said stored singular-reference arrays, whereby a best-match yields a corresponding phoneme symbol recognition output.

10. In a method of speech recognition using Mainwave-Ripple Analysis, a method of training for recognition comprising the steps:

(a) generating and storing (a1) singular-reference arrays which are known-phoneme single frame reference arrays formed by combining a most-probable single-frame waveform analysis array with its corresponding phoneme sysmbol, (a2) universal-reference arrays which are a plurality of sets of phoneme reference arrays formed by interpolation of parameter values between singular arrays of a basso and soprano to cover the male-female analysis array parameter range, and (a3) personal-reference arrays which are generated from prompted calibrating commands; and (b) generating an extended set of personal reference arrays by adding related-value universal reference arrays.

11. In a method of speech recognition using Mainwave-Ripple Analysis, a method of coarse recognition using a phoneme/phonode approximation comprising the steps of:

(a) grouping phonemes having similar sounds and similar waveform analysis arrays into confusion groups;

(b) selecting from each confusion group one phoneme, called a phonode, which is an optimal representative for the group, for print or phonemic talkback; and (c) generating and storing a set of phonode-reference arrays which have broadened ranges of phoneme waveform parameters to cover the confusion group, whereby recognition processing can be limited to recognizing the phoneme's confusion group and outputting the corresponding phonode.

12. The method of claim 11, wherein said phonodes include at least 4 basic phoneme waveforms called protowaves.

13. A computer program storage device readable by a computer system, tangibly embodying a program of instructions executable by the computer system to perform a speech recognition method, said method comprising the steps of:

(a) pre-processing an input speech signal to output an amplitude-normalized digital speech signal;

(b) sequentially locating each signal waveform in a short time interval called a frame;

(c) analyzing each said waveform by Mainwave-Ripple Analysis comprising locating and measuring structural features to derive a waveform anaysis array comprising measures of the distribution of amplitude and zero-crossings in very short intervals called local intervals, and high and low values of the local interval values for the frame called minimax values;

(d) training for speech recognition by combining a most-probable waveform analysis array with its known phoneme symbol to generate reference arrays, and (e) recognizing unknown phoneme waveforms by comparing each unknown input speech signal waveform analysis array with prestored reference arrays, whereby a best match effects phoneme recognition.

14. A system for speech recognition which converts an input analog speech signal to corresponding phonemic text, said system comprising:

(a) means for pre-processing an input speech signal to output an amplitude-normalized digital speech signal;

(b) means for sequentially locating each signal waveform in a short time interval called a frame;

(c) means for analyzing said waveform by Mainwave-Ripple Analysis comprising locating and measuring structural features to derive a waveform analysis array comprising measures of the distribution of amplitude and zero-crossings in very short intervals called local intervals, and high and low values of the local interval values for the frame called minimax values;

(d) means for selecting one of several operating mode means, including training and recognition;

(e) training means for combining a most-probable single-frame waveform analysis array with a known phoneme symbol to generate single-frame reference arrays, and (f) means for recognizing unknown phoneme waveforms by comparing each unknown input speech signal waveform analysis array with prestored single-frame reference arrays, whereby a best-match effects phoneme recognition.

15. The system of claim 14, further including selectable multi-frame operating mode means, comprising:

(g) multi-frame analysis means for analyzing the sequential single-frame waveform analysis arrays, whereby similar-value arrays are grouped to form a sequence of single-frame groups, said sequence called a multi-frame pattern representative of a phoneme;

(h) multi-frame pattern training means for combining a known multi-frame pattern with its corresponding known phoneme symbol, thereby generating multi-frame reference patterns, and (i) multi-frame pattern recognition means for comparing unknown input multi-frame patterns with prestored reference patterns, whereby a best match effects phoneme recognition.

16. A method for speech recognition which converts an input analog speech signal to corresponding phonemic text, said method comprising the steps of:

(a) pre-processing an input speech signal to output an amplitude-normalized digital speech signal;

(b) sequentially locating each signal waveform in a short time interval called a frame;

(c) analyzing said waveform by Mainwave-Ripple Analysis comprising locating and measuring structural features to derive a waveform analysis array comprising measures of the distribution of amplitude and zero-crossings in very short intervals called local intervals, and high and low values of the local interval values for the frame called minimax values;

(d) selecting one of several operating modes including training and recognition;

(e) training by combining a most-probable single-frame waveform analysis array with its known phoneme symbol to generate single-frame reference arrays, and (f) recognizing unknown phoneme waveforms by comparing each unknown input speech signal waveform analysis array with prestored single-frame reference arrays, whereby a best-match effects phoneme recognition.

17. The method of claim 16, further including a selectable multi-frame operating mode comprising:

(g) multi-frame analysis for analyzing the sequential single-frame waveform analysis arrays, whereby similar-value arrays are grouped to form a sequence of single-frame groups, said sequence called a multi-frame pattern representative of a phoneme;

(h) multi-frame pattern training by combining a known multi-frame pattern with its corresponding known phoneme symbol, thereby generating multi-frame reference patterns, and (i) multi-frame pattern recognition by comparing unknown input multi-frame patterns with prestored reference patterns, whereby a best match effects phoneme recognition.

* * * * *